United States Patent
Li

(10) Patent No.: US 7,974,537 B2
(45) Date of Patent: Jul. 5, 2011

(54) INTELLIGENT PLUGGABLE TRANSCEIVER STICK CAPABLE OF DIAGNOSTIC MONITORING AND OPTICAL NETWORK MANAGEMENT

(75) Inventor: Wen Li, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 597 days.

(21) Appl. No.: 12/133,581

(22) Filed: Jun. 5, 2008

(65) Prior Publication Data

US 2009/0304384 A1    Dec. 10, 2009

(51) Int. Cl.
    *H04B 10/00* (2006.01)
(52) U.S. Cl. .......... 398/135; 398/138
(58) Field of Classification Search .......... 398/135–139
    See application file for complete search history.

(56) References Cited

U.S. PATENT DOCUMENTS

| | | | |
|---|---|---|---|
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 7,007,145 B2 * | 2/2006 | Schrodinger et al. | 711/164 |
| 7,092,604 B2 * | 8/2006 | Edwards et al. | 385/100 |
| 7,107,414 B2 * | 9/2006 | Hidai et al. | 711/154 |
| 7,418,015 B2 * | 8/2008 | Hosking | 372/26 |
| 7,426,348 B2 * | 9/2008 | Mahowald et al. | 398/135 |
| 7,532,820 B2 * | 5/2009 | Aronson | 398/135 |
| 7,551,852 B2 * | 6/2009 | Reintjes et al. | 398/33 |
| 7,564,894 B2 * | 7/2009 | Woolf et al. | 375/219 |
| 7,668,512 B2 * | 2/2010 | Woolf et al. | 455/67.11 |
| 7,721,012 B2 * | 5/2010 | Le et al. | 710/8 |
| 7,757,936 B2 * | 7/2010 | Aguren et al. | 235/375 |
| 2002/0039214 A1 | 4/2002 | Ruan | |
| 2002/0186439 A1 | 12/2002 | Buabbud | |
| 2003/0180049 A1 | 9/2003 | Park | |
| 2004/0091265 A1 | 5/2004 | Kim | |
| 2005/0041971 A1 | 2/2005 | Lee | |
| 2005/0044335 A1 * | 2/2005 | Bee et al. | 711/170 |
| 2006/0062116 A1 * | 3/2006 | Ishibashi | 369/47.35 |
| 2006/0082866 A1 | 4/2006 | Takahashi | |
| 2006/0110157 A1 * | 5/2006 | Tritschler et al. | 398/22 |
| 2006/0147211 A1 | 7/2006 | Kim | |
| 2006/0153566 A1 | 7/2006 | Sorin | |
| 2007/0092257 A1 * | 4/2007 | Smith et al. | 398/135 |
| 2007/0116466 A1 | 5/2007 | Gewirtzman | |
| 2007/0165688 A1 | 7/2007 | Lee | |
| 2008/0022363 A1 * | 1/2008 | Le et al. | 726/2 |
| 2008/0159737 A1 * | 7/2008 | Noble et al. | 398/16 |
| 2009/0103926 A1 * | 4/2009 | Hotchkiss et al. | 398/135 |
| 2009/0304384 A1 * | 12/2009 | Li | 398/58 |
| 2009/0317073 A1 * | 12/2009 | Hotchkiss et al. | 398/1 |

* cited by examiner

*Primary Examiner* — Agustin Bello
(74) *Attorney, Agent, or Firm* — SV Patent Service

(57) ABSTRACT

An integrated optical transceiver includes an optical subassembly that produces a first electrical signal in response to a first optical signal comprising reception signal data and to emit a second optical signal comprising transmission signal data in response to a second electrical signal. A data processing unit can extract the reception signal data from the first electrical signal and produce the second electrical signal in response to a third electrical signal comprising the transmission signal data. The data processing unit can perform system-layer functions. A data path interface can send the reception data to a host device and receive the third electrical signal comprising the transmission data from the host device. A management unit can control the data processing unit to perform the system-layer functions. A control path interface communicates with the management unit and the host device.

26 Claims, 6 Drawing Sheets

INTELLIGENT PLUGGABLE TRANSCEIVER STICK CAPABLE OF DIAGNOSTIC MONITORING AND OPTICAL NETWORK MANAGEMENT

BACKGROUND

The present disclosure relates to optical communications over an optical network.

As voice over Internet Protocol (VoIP) and Internet Protocol television (IPTV) grow in popularity, an increasing number of users desire to have access to these services from their premises. Similarly, businesses now require more bandwidth available to their premises with necessary quality of service. To meet these needs, network carriers are building optical access networks with different network topologies such as fiber-to-the-premises, fiber-to-the-node, or fiber-to-the-building with many different access transport solutions including BPON, EPON, GPON, WDN-PON and active Ethernet.

As service provides' networks are becoming more complex, different technology solutions and a wide variety of equipments at customer premises have made inventory and operational expenditure (OPEX) key challenges for service providers across the globe. There is therefore a need to enhance system and management functions and to simplify operational complexity in access network.

SUMMARY

In a general aspect, the present specification relates to an integrated optical transceiver that includes an optical subassembly that can produce a first electrical signal in response to a first optical signal and to emit a second optical signal in response to a second electrical signal, wherein the first optical signal comprises reception signal data, wherein the second optical signal comprises transmission signal data; a data processing unit in communication with the optical subassembly, wherein the data processing unit can extract the reception signal data from the first electrical signal and produce the second electrical signal in response to a third electrical signal comprising the transmission signal data, wherein the data processing unit can perform system-layer functions comprising media access control (MAC), Ethernet/ATM switching, forward error correction, or OAM message processing; a data path interface in communication with the data processing unit, wherein the data path interface can send the reception data to a host device and receive the third electrical signal comprising the transmission data from the host device; a management unit in communication with the optical subassembly and the data processing unit, wherein the management unit can control the data processing unit to perform the system-layer functions; and a control path interface in communication with the management unit and the host device.

In another general aspect, the present specification relates to an optical communication network that includes a host device at a first location; a network device at a second location remote to the first location; and an integrated optical transceiver plugged into an interface in the host device. The integrated optical transceiver includes an optical subassembly that can produce a first electrical signal in response to a first optical signal received from the network device and to transmit a second optical signal to the network device in response to a second electrical signal, wherein the first optical signal comprises reception signal data, wherein the second optical signal comprises transmission signal data; a data processing unit in communication with the optical subassembly, wherein the data processing unit can extract the reception signal data from the first electrical signal and produce the second electrical signal in response to a third electrical signal comprising the transmission signal data, wherein the data processing unit can perform system-layer functions comprising media access control (MAC), Ethernet/ATM switching, forward error correction, or OAM message processing; a data path interface in communication with the data processing unit, wherein the data path interface can send the reception data to a host device and receive the third electrical signal comprising the transmission data from the host device; a management unit in communication with the optical subassembly and the data processing unit, wherein the management unit can control the data processing unit to perform the system-layer functions; and a control path interface in communication with the management unit and the host device, wherein the management unit can send physical-layer control data to the data processing unit, wherein the data processing unit can insert the physical-layer control data into the second electrical signal, wherein the second optical signal comprises the physical-layer control data, wherein the network device can access the physical-layer control data stored in the computer memory without assistance from the host device.

In yet another general aspect, the present specification relates to an integrated optical transceiver that includes an optical subassembly that can produce a first electrical signal in response to a first optical signal and to emit a second optical signal in response to a second electrical signal, wherein the first optical signal comprises reception signal data, wherein the second optical signal comprises transmission signal data; a data processing unit in communication with the optical subassembly, wherein the data processing unit can extract the reception signal data from the first electrical signal and produce the second electrical signal in response to a third electrical signal comprising the transmission signal data, wherein the data processing unit can perform system-layer functions comprising media access control (MAC), Ethernet/ATM switching, forward error correction, or OAM message processing; a data path interface in communication with the data processing unit, wherein the data path interface can send the reception data to a host device and receive the third electrical signal comprising the transmission data from the host device, wherein the data path interface is in compliance with a standard selected from the group consisting of GBIC, SFF, SFP, XFP, X2, XENPAK, and SFP+; a management unit in communication with the optical subassembly and the data processing unit, wherein the management unit can control the data processing unit to perform the system-layer functions; a computer memory that can store a memory map defined in the SFF-8472 document and to store the system-layer control data; and a control path interface in communication with the management unit and the host device, wherein the control path interface is compatible with a standard selected from the group consisting of Inter-Integrated Circuit (I2C), differential serial interface, a serial peripheral interface (SPI), and General Purpose Input/Output (GPIO).

Implementations of the system may include one or more of the following. The control path interface is compatible with a standard selected from the group consisting of Inter-Integrated Circuit (I2C), differential serial interface, a serial peripheral interface (SPI), and General Purpose Input/Output (GPIO). The management unit can control the data processing unit to perform the system-layer functions in response to system-layer control data, wherein the management unit can control, monitor, and manage the optical subassembly in response to the system-layer control data. The control path interface can send at least a portion of the system-layer control data to the host device. The management unit can send physical-layer control data to the data processing unit, wherein the data processing unit can insert the physical-layer control data into the second electrical signal, wherein the second optical signal comprises the physical-layer control data. The integrated optical transceiver can further include a computer memory that can store the system-layer control data. The computer memory can store a memory map defined in the SFF-8472 document. The memory map can store the system-level control data. The computer memory can include at least one memory block outside the memory map, wherein the memory block can store the system-layer control data at a memory address not defined in SFF-8472. The integrated optical transceiver can include a form factor in compliance with a standard selected from the group consisting of GBIC, SFF, SFP, XFP, X2, XENPAK, and SFP+. The integrated optical transceiver can include a laser driver in communication with the data processing unit, wherein the laser driver can control the optical subassembly to emit the second optical signal in response to the second electrical signal; and a post amplifier in communication with the data processing unit and the optical subassembly, wherein the post amplifier can amplified the first electrical signal and to send an amplified first electrical signal to the data processing unit.

Embodiments may include one or more of the following advantages. The disclosed optical transceiver devices carry intelligent features for local system layer management without involving host devices, which significantly simplifies the communications of optical networks. The disclosed optical transceiver devices can thus allow optical communications between different types of host device and network device without requiring interoperability between the devices. The disclosed transceiver devices can also be implemented in compliance with standard transceiver format and protocols. The additional local management is provided while keeping the standard communications in the optical/physical layer in the conventional optical transceivers and with host or remote network equipment.

The disclosed optical transceiver is applicable to a multi-channel optical communication network such as an optical network between an optical terminal, remote nodes, and optical network units.

Although the specification has been particularly shown and described with reference to multiple embodiments, it will be understood by persons skilled in the relevant art that various changes in form and details can be made therein without departing from the spirit and scope of the specification.

DETAILED DESCRIPTION

Figure 1:
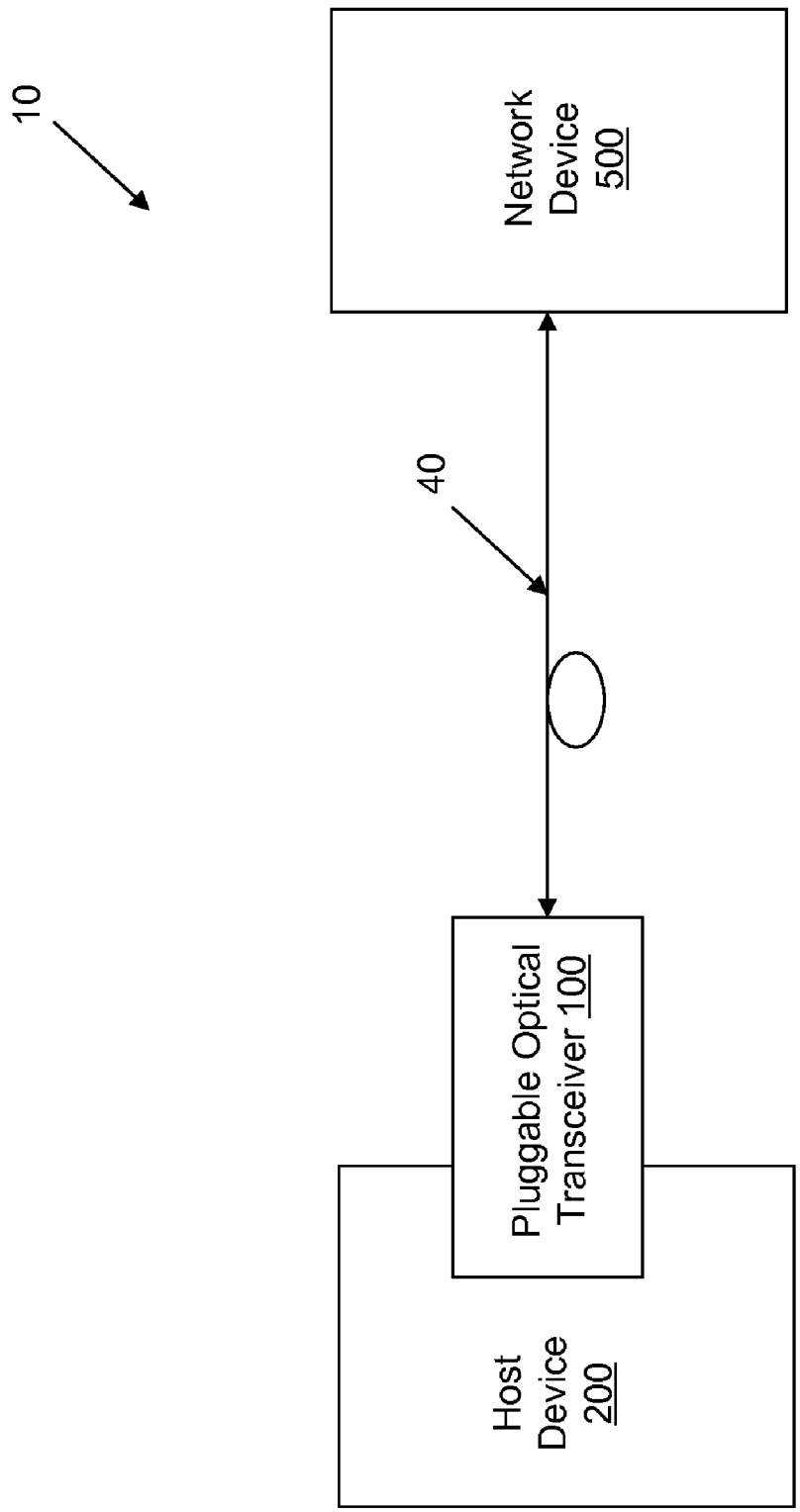
FIG. 1 is a block diagram for an optical network system spanning multiple communication nodes, at least one of which includes an optical transceiver communicating with a host device via standard interface.

Referring to FIG. 1, an optical network system 10 includes a pluggable optical transceiver 100 that is plugged into a host device 200 at a first site, and network equipment 500 at a second site. The first site can, for example, be an optical network unit (ONU). The second site can be an OLT remote to the ONU. The pluggable optical transceiver 100 is an integrated device, which can have a form factor as defined by standards for optical transceivers, such as GBIC, SFF, small form-factor pluggable (SFP), XFP, X2, XENPAK, and SFP+. The interface between the pluggable optical transceiver 100 and the host device 200 can also be defined by such standards. As described below, the pluggable optical transceiver 100 includes intelligent functions capable of diagnostic monitoring and optical network management. In the present specification, the pluggable optical transceiver 100 is also referred to as "system stick".

The architecture of modern communication networks are commonly defined by an open system interconnection (OSI) model comprising the following network layers: Layer 1: physical layer; Layer 2: data link layer; Layer 3: network layer; Layer 4: transport layer; Layer 5: session layer; Layer 6: presentation layer; and Layer 7: application layer. In the present specification, the term "system layer" refers to the Layers from Layer 2 to Layer 7. Conventional optical transceivers include simple optical/electrical (O/E) converters and operate purely the physical layer. The disclosed system stick provides functions beyond physical layer. These operations can include, for example, media access control (MAC), Ethernet/ATM switching, operation administration management (OAM) message process, forward error correction (FEC), etc.

The pluggable optical transceiver 100 is connected with the network equipment 500 via an optical link 40 that can be formed by a single fiber or a fiber bundle. The host device 200 can communicate with the network equipment 500 by communications at the standard interface with the pluggable optical transceiver 100 and communications between the pluggable optical transceiver 100 and the network equipment 500.

Figure 2:
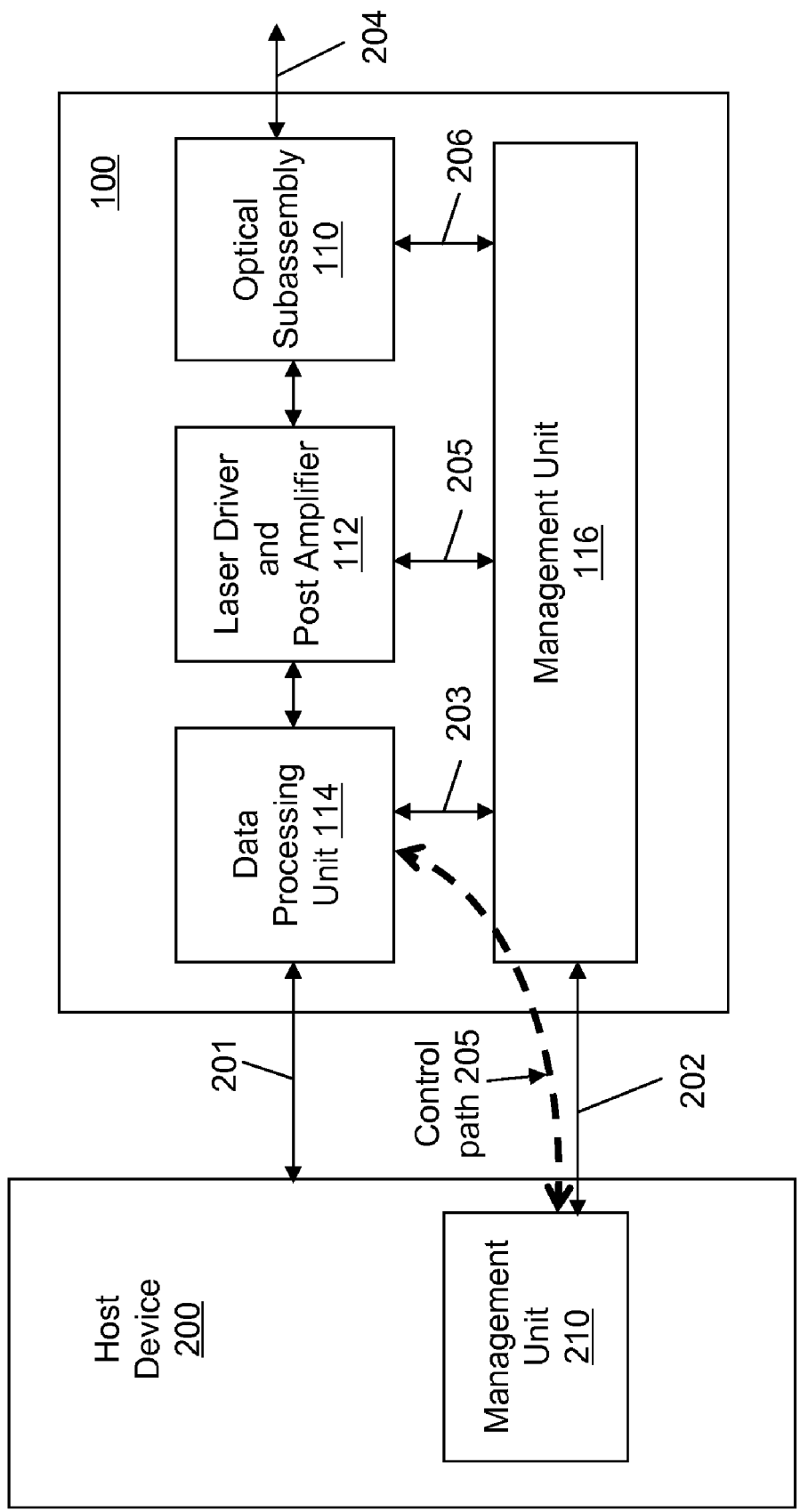
FIG. 2 is a block diagram of an exemplified pluggable transceiver unit and a host device.

Referring to FIG. 2, the pluggable optical transceiver 100 includes an optical subassembly (OSA) 110 that includes an optical transmitter (not shown) and optical receiver (not shown) that can respectively send and receive data at an interface 204 for transmission and reception of optical signals, and a unit 112 in connection with the OSA 110. The unit 112 includes a laser driver 112 for driving the optical transmitter in the OSA 110 and a post amplifier for amplifying electric signals from the optical receiver in the OSA 110. The pluggable optical transceiver 100 also includes a data processing unit 114 that has functions beyond physical layer, such as media access control (MAC), switch/bridge data protocol. A management unit 116 controls, monitors and manages the performance of the pluggable optical transceiver 100. The pluggable optical transceiver 100 has a data path interface 201 connecting to data processing unit 114 and the control path interface 202 communicating to management unit 116. It should be noted that the data processing unit 114 and the management unit 116 are not included in standard conventional optical transceivers.

The above functional blocks (110, 112, 114, and 116) can be implemented by one or more physical devices. For example, the unit 112 can be implemented by a separate laser driver and a separate post amplifier. On the other hand, many functional blocks can also be integrated into one physical device. For example, the management unit 116 and the data processing unit 114 can be integrated into a single device.

The pluggable optical transceiver 100 can connect with a host device 200 through a standard interface that consists of the data path interface 201 and the control path interface 202. The data path interface 201 can be high speed differential serial interface, Inter-Integrated Circuit (I2C), differential serial interface, gigabit media independent interface (GMII), 10G media independent interface (XGMII), 10G attachment unit interface (XAUI), General Purpose Input/Output (GPIO), or other standard interfaces.

In the transmission data path, the data processing unit 114 receives transmission data from the host device 200 via the data path interface 201, and sends processed data to the unit 112. The laser diver in the unit 112 drives the optical transmitter in the optical subassembly 110 to output an optical signal comprising the transmission data at the optical interface 204.

In the reception data path, optical subassembly 110 receives an optical signal containing reception data at the interface 204 and sends an electric signal containing the reception data to the post amplifier in the unit 112. The post amplifier amplifies the electric signal and sends it to the data processing unit 114, which subsequently processes the reception data and sends it to the data path interface 201.

In the control path, a control signal is communicated through a control path interface 202 between the management unit 116 in the pluggable optical transceiver 100 and the management unit 210 in the host device 200. A control signal can include diagnostic data, configuration data and other management data. The host device 200 can manage operations of the pluggable optical transceiver 100 in the optical/physical layer through the control path interface 202. The operations the optical/physical layer can include control and monitoring of the laser driver and the post amplifier control in the unit 112, monitoring of optical signals and related parameters, tracking and responding to warnings and alarms, and other management functions in the optical/physical layer as defined in various standards and multiple source agreements (MSA).

The described pluggable optical transceiver 100 can be beneficial to both equipment vendors and carriers. It integrates generic optical transceiver functions and system layer protocol/MAC functions together inside an integrate4d transceiver device that complies with a widely adopted transceiver form-factor, which relieves the host device from performing these system layer protocol/MAC functions. In other words, system layer management can be conducted locally in the pluggable optical transceiver. A clear separation of optical-layer communications from customer access can therefore simplify the requirements on the host devices, which allows greater flexibility for the described intelligent pluggable optical transceiver to interconnect with different types of equipments at customer premise.

One limitation associated with conventional pluggable optical transceivers is that the conventional control path interfaces (such as I2C interface on a SFP transceiver) are designed to provide local digital diagnostic monitoring (DDM) interface for generic optical transceivers. These conventional control path interfaces only allow a host device to monitor and control optical layer performance. The host device however cannot access system level performance of the pluggable optical transceiver.

In contrast, the pluggable optical transceiver 100 can provide the host device 200 control management capabilities for at the system layer in addition to the optical/physical layer. A virtual control path 205 is formed by the control path interface 202 and a control interface 203. The control path interface 202 facilitates the communication between the management unit 210 and the management unit 116. The control interface 203 allows communications between the management unit 116 and the data processing unit 114. Control commands from the host device 200 are first sent to and processed by the management unit 116. The management unit 116 sends control signals to the data processing unit 114, which can control the laser driver in the unit 112 for driving the optical transmitter in the optical subassembly 110. In the reverse direction, control information from the data processing unit 114 is first received and processed by the management unit 116 before sent to the host device through control path interface 202.

In some embodiments, the control path interface 202 is an I2C interface. The management unit 210 can perform as a master and the management unit 116 can perform as a slave. The control interface 203 can be a universal asynchronous receiver/transmitter (UART), a 10/100 base Ethernet, a serial peripheral interface (SPI), or an I2C interface. The control interface 203 can be an I2C interface with the data processing unit 114 as a master and the management unit 116 as a slave. Thus, the management unit 116 can function as a middleware to inter-connect two I2C masters (data processing unit 114 and the management unit 210).

In some embodiments, the management unit 116 can perform transformations of data format and communication protocols. For example, a command based on I2C received from the control path interface 202 can be transformed by the management unit 116 to a UART format before it is sent to the control interface 203.

Figure 3:
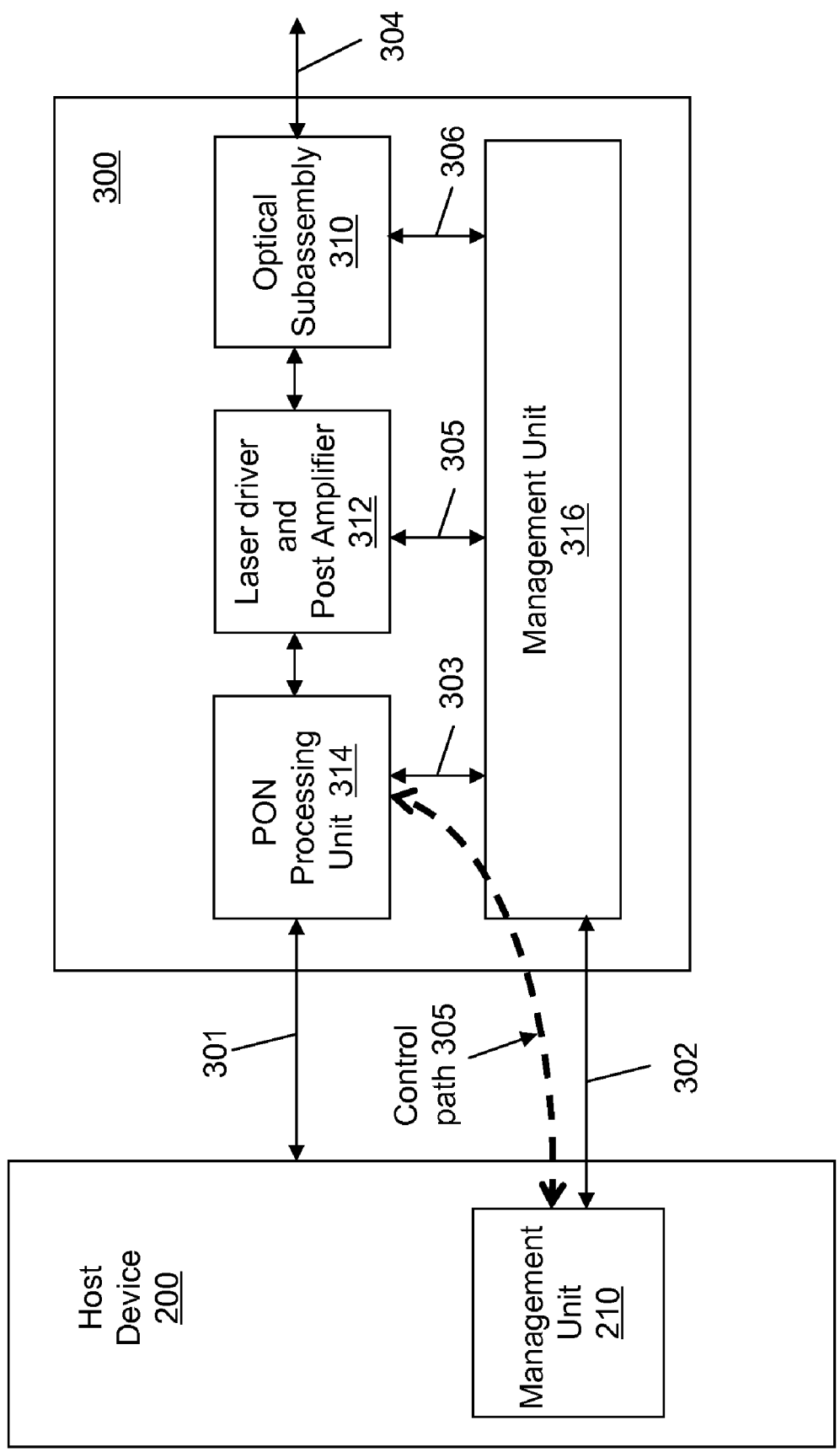
FIG. 3 is a block diagram of another exemplified pluggable transceiver unit and a host device.

In some embodiments, referring to FIG. 3, an exemplified pluggable optical transceiver 300 is a passive optical network (PON) processing unit integrated in a small form factor pluggable (SFP) optical transceiver. The pluggable optical transceiver 300 includes an optical subassembly (OSA) 310 that includes an optical transmitter (not shown) and optical receiver (not shown) that can respectively send and receive data at an interface 304 for transmission and reception of optical signals, and a unit 312 in connection with the OSA 310. The unit 312 includes a laser driver for driving the optical transmitter in the OSA 310 and a post amplifier for amplifying electric signals from the optical receiver in the OSA 310. The pluggable optical transceiver 300 also includes a PON processing unit 314 that is configured to process PON related protocols and other management commands for physical/optical layer. A management unit 316 is configured to control, monitor and manage the performance of the pluggable optical transceiver 300. A data path interface 301 connects the PON processing unit 314 and the host device 200. A control path interface 302 connecting the management unit 316 and the management unit 210.

In the transmission data path, the PON processing unit 314 receives transmission data from the host device 200 via the data path interface 301, and sends processed data to the unit 312. The laser diver in the unit 312 drives the optical transmitter in the optical subassembly 310 to output an optical signal comprising the transmission data at the optical interface 304.

In the reception data path, optical subassembly 310 receives an optical signal containing reception data at the interface 304 and sends an electric signal containing the reception data to the post amplifier in the unit 312. The post amplifier amplifies the electric signal and sends it to the Data processing unit 314, which subsequently processes the reception data and sends it to the data path interface 301.

In the control path, a control signal is communicated through a control path interface 302 between the management unit 316 in the pluggable optical transceiver 300 and the management unit 310 in the host device 200. A control signal can include diagnostic data, configuration data and other management data. The host device 200 can manage operations of the pluggable optical transceiver 300 in the optical/physical layer through the control path interface 302. The operations the optical/physical layer can include control and monitoring of the laser driver and the post amplifier control in the unit 312, monitoring of optical signals and related parameters, tracking and responding to warnings and alarms, and other management functions in the optical/physical layer as defined in various standards and multiple source agreements.

The pluggable optical transceiver 300 can provide the host device 200 control management capabilities for at the system layer in addition to the optical/physical layer. A virtual control path 205 is formed by the control path interface 202 and the control interface 203. The control path interface 202 facilitates the communication between the management unit 210. The control interface 203 allows communications between the management unit 316 and the Data processing unit 314. Control commands from the host device 200 are first sent to and processed by the management unit 316. The management unit 316 sends control signals to the Data processing unit 314, which can control the laser driver in the unit 312 for driving the optical transmitter in the optical subassembly 310. In the reverse direction, control information from the Data processing unit 314 is first received and processed by the management unit 316 before sent to the host device through control path interface 202.

Optical/physical management in generic SFP optical transceivers is defined by Small Form-Factor Committee in a SFF-8472 document published in 2004. The pluggable optical transceiver (100 or 300) can provide control interface compatible with this and other MSA for optical transceivers while still providing upper management capability.

Figure 4A:
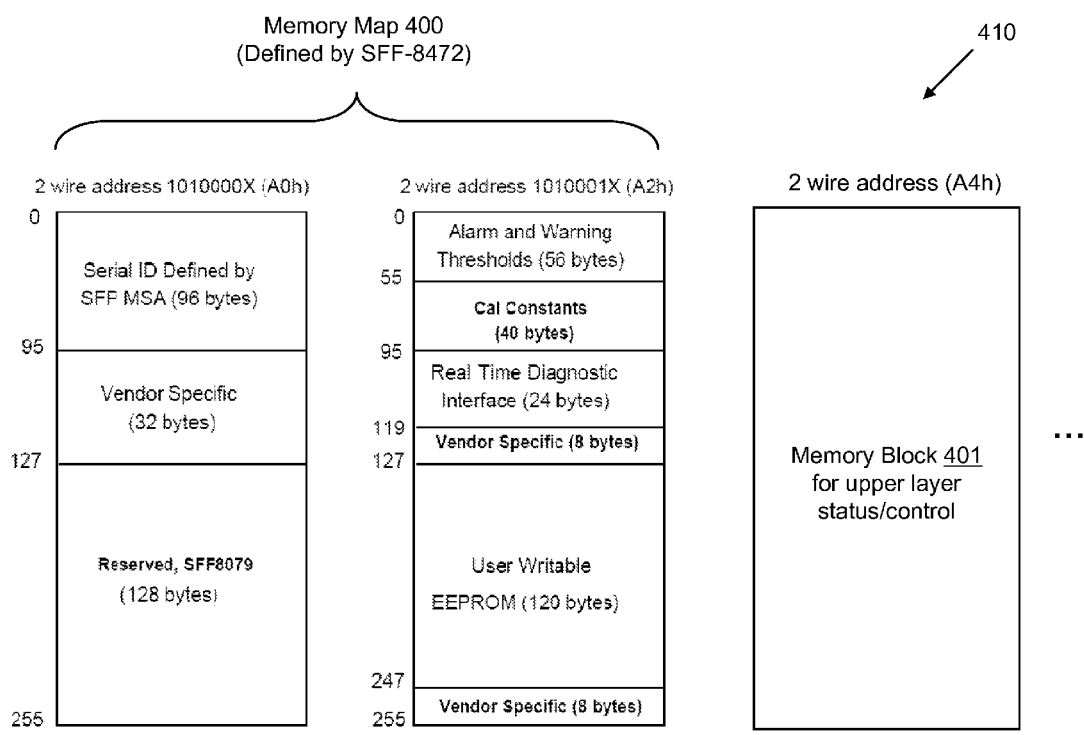
FIG. 4A illustrates an exemplified digital diagnostic memory extension compatible with the pluggable transceiver unit shown in FIGS. 2 and 3.

In some embodiments, FIG. 4A illustrates an exemplified improved memory map 410 which allows local control management in the disclosed pluggable optical transceivers but is also retrospectively compatible with the standard SFF-8472 document. The improved memory map 410 includes a memory map 400 that is defined by the SFF-8472 document for an optical transceiver that functions as a slave. The memory map 400 includes two I2C addresses A0h and A2h, of two control management interfaces. As a master, a host device can access the two 256 byte memory blocks defined in the SFF-8472 document.

The improved memory map 410 also includes one or more memory blocks 401 for storing system-layer management data in the disclosed pluggable optical transceivers (100, 300). The memory block 401 can store system layer data that can be accessed by the host device via the control data interface (e.g. I2C). The additional memory block 401 can for example be a memory page containing 256 Byte under a new slave address A4h. Other addresses such as A6h, A8h can be used to defined additional memory pages.

Figure 4B:
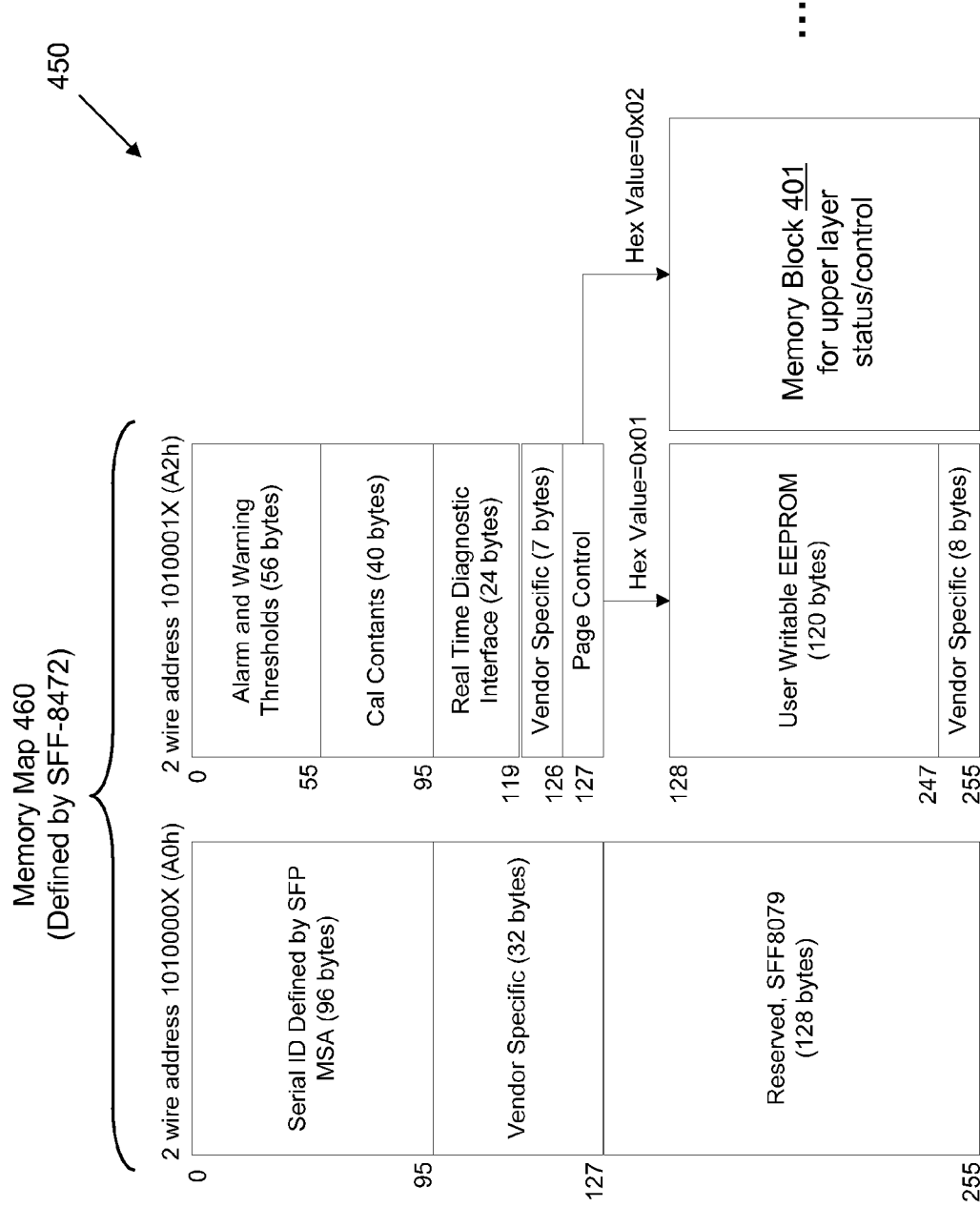
FIG. 4B illustrates another exemplified digital diagnostic memory extension without increasing I2C addresses.

In some embodiments, memory blocks can be added for local system layer management without defining new memory addresses. As illustrated in FIG. 4B, an improved memory map 450 includes a memory map 460 that is compatible with the standard SFF-8472 document without additional memory blocks (like 401). A vendor-specific byte in the memory map 460 can be used as a pointer. Different memory blocks can be accessed by the host device depending on the value of the pointer. For example, Byte 127 on the A2h memory page can be set as the pointer. When the value of the pointer is 0, the host device can access the upper 128 bytes in A2h page defined as the SFF-8472 document. When the value of the pointer equals to 1, the upper 128 bytes in A2 can be directed to the lower 128 bytes that is unused previously but can now be used for storing data for system management.

In some embodiments, referring to FIG. 3, the system-level management of a system stick can be accessed at the local control interface without increasing any memory block. In addition to be compatible to the DDM memories for conventional optical transceivers defined in SFF-8472, the management unit 316 can operate in an information pass through mode for system-level management data to allow the data processing unit 314 to exchange information with the management unit 210. In this pass-through mode, the management unit 316 only relays messages, and converts protocols between control interfaces 302 and 303. There is no need to manage extra memories other than that defined in SFF-8472.

An advantage of the above described embodiments for storing system management data is that the improved memory map can be compatible with existing MSA standards such as the SFF-8472 document. This compatibility allows the described pluggable optical transceivers to be fully compatible in communication protocols while still providing additional intelligent system-level management capabilities.

Above discussions address how a host network device can locally manage operations in both optical/physical and system layer of an optical pluggable optical transceiver. In an optical network system 10, as shown in FIG. 1, is also important that the network device 500, has the capability to remotely monitor and manage the pluggable optical transceiver 100. In conventional optical transceivers, optical layer management data are accessed through a local management interface, such as I2C interface. A network device at a remote site needs the assistance from the host device to accomplish remote management of the optical transceiver (that may be plugged into the host device). This process requires the remote network device and the host device to be fully interoperable in regard to data and management communication protocols. However, the interoperability does not always exist because the remote network device and the host device in real world optical networks are usually of different vintages and of different grades (carrier-grade vs. enterprise grade), owned and operated by different parties (e.g. service providers and customers), and guided by different maintenance practices (carrier-grade vs. enterprise grade). The lack of interoperability between the remote network device and the host device can prevent proper communication of management data at the two different sites.

Figure 5:
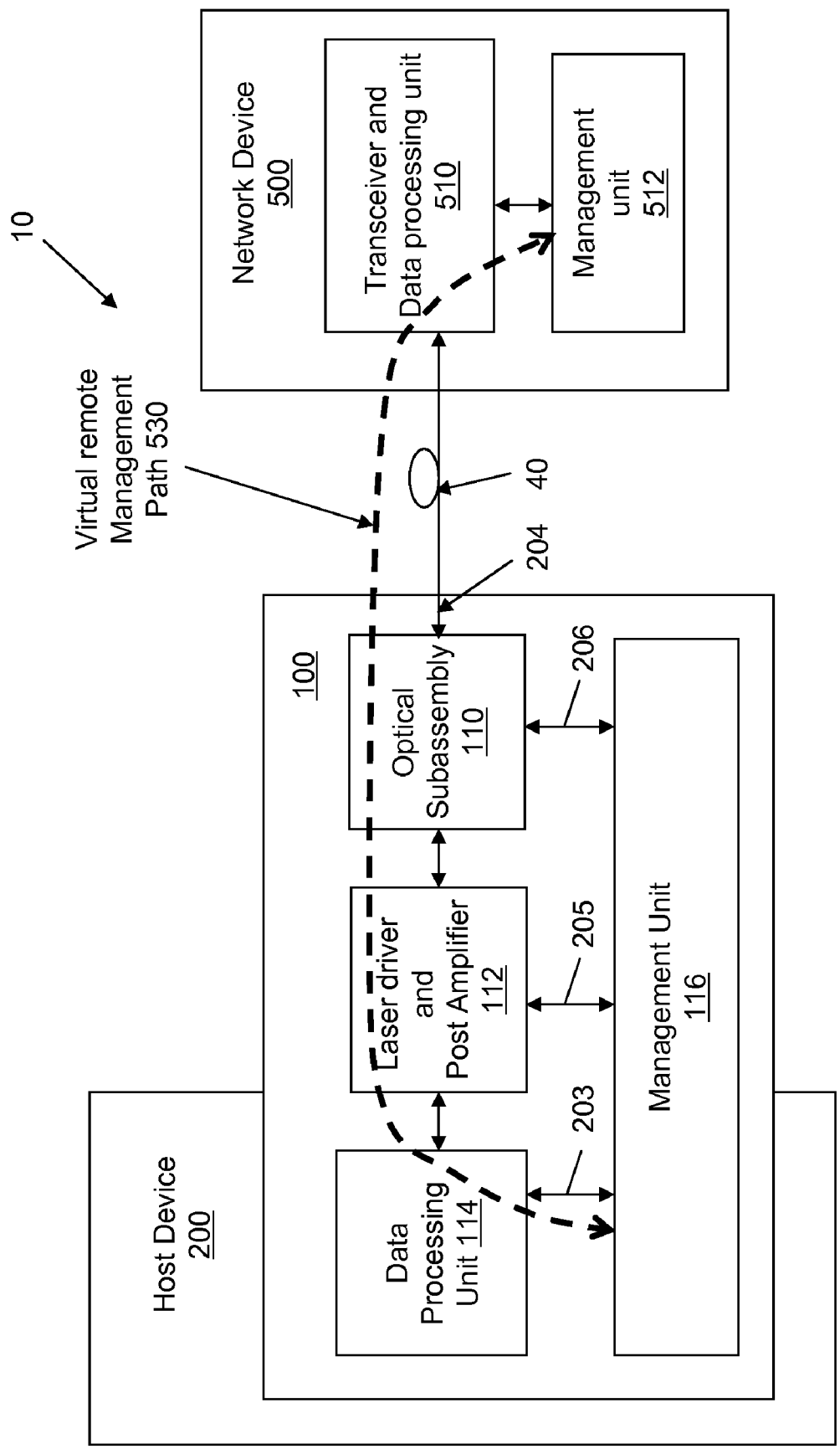
FIG. 5 is a block diagram of an optical line terminal (OLT) in communication with a pluggable transceiver unit capable of remote digital diagnostic management (DDM).

To overcome this problem, the disclosed systems and methods provide means to enable the network device 500 to remotely retrieve management data without involving of the host device 200. Referring to FIG. 5, the network device 500 includes a transceiver and data processing unit 510 and a management unit 512. The pluggable optical transceiver 100 is connected with the network equipment 500 via an optical link 40. The optical transceiver 100 is plugged into a standard interface in the host device 200. As described above, the management unit 116 can communicate with the data processing unit 114 via the control interface 203. The management unit 116 can respectively communicate with the unit 112 and the optical subassembly 110 through the connections 205 and 206. The management unit 116 can control, monitor, and manage the optical performance of the pluggable optical transceiver 100 via the connections 205 and 206.

The optical subassembly 110 can produce a first electrical signal in response to a first optical signal from the network device 500 via optical link 40. The first optical signal includes reception signal data. The optical subassembly 110 can also emit a second optical signal in response to a second electrical signal wherein the second optical signal comprises transmission signal data. The data processing unit 114 is in communication with the optical subassembly 110. The data path interface (301 in FIG. 3) can send the reception data to the host device 200 and receive a third electrical signal comprising the transmission data from the host device 200. The data processing unit 114 can extract the reception signal data from the first electrical signal and produce the second electrical signal in response to the third electrical signal comprising the transmission signal data. The data processing unit 114 can perform system-layer functions that include media access control (MAC), Ethernet/ATM switching, forward error correction, or OAM message processing. The management unit 116 can control the data processing unit 114 to perform the system-layer functions.

The network device 500 and the pluggable optical transceiver 100 can belong to same network class and are often supported by the same service provider. It is thus readily for them to be fully interoperable. A virtual remote management link 530 between the management unit 512 in the network device 500 and the management unit 116 in the pluggable optical transceiver 100 can be established via the transceiver and data processing unit 510, the optical subassembly 110 (that includes an optical receiver and an optical transceiver), the unit 112, and the data process unit 114. The management unit 116 can collect optical layer data and send them to the data processing unit 114 via the control interface 203. The data processing unit 114 sends the data via unit 112 and the optical subassembly 110 to the data processing unit 510 in specific data/management protocols. Finally, the optical layer data is received by the management unit 512.

In some embodiments, the pluggable optical transceiver 100 complies with the SFP standard. The network device 500 can remotely access DDM memories defined in SFF-8472 and also the additional memory block 401 as illustrated in FIG. 4. In some embodiments, the pluggable optical transceiver 100 complies with SFP for a PON. The network device 500 is a PON at an OLT. The OLT network device 500 at the OLT can remotely access optical transceiver DDM memories defined in SFF-8472.

It is understood that the specific configurations and parameters described above are meant to illustration the concept of the specification. The disclosed systems and methods can be compatible with variations of configurations and parameters without deviating from the spirit of the present invention. For example, the disclosed systems and methods are compatible with point-to-point optical networks and point-to-multi-point optical networks. The disclosed system and methods are also compatible with active and passive devices. The disclosed optical transceivers, optical communication network, and optical communication systems can include additional components or have different constructions as described above. The disclosed optical transceivers can be compatible with other standards not listed in the above description.

What is claimed is:

1. An integrated optical transceiver, comprising:
   an optical subassembly configured to produce a first electrical signal in response to a first optical signal and to emit a second optical signal in response to a second electrical signal, wherein the first optical signal comprises reception signal data, wherein the second optical signal comprises transmission signal data;
   a data processing unit in communication with the optical subassembly, wherein the data processing unit is configured to extract the reception signal data from the first electrical signal and produce the second electrical signal in response to a third electrical signal comprising the transmission signal data, wherein the data processing unit is configured to perform system-layer functions comprising media access control (MAC), Ethernet/ATM switching, or OAM message processing;
   a data path interface in communication with the data processing unit, wherein the data path interface is configured to send the reception data to a host device and receive the third electrical signal comprising the transmission data from the host device;
   a management unit in communication with the optical subassembly and the data processing unit, wherein the management unit is configured to control the data processing unit to perform the system-layer functions; and
   a control path interface in communication with the management unit and the host device.

2. The integrated optical transceiver of claim 1, wherein the control path interface is compatible with a standard selected from the group consisting of Inter-Integrated Circuit (I2C), differential serial interface, a serial peripheral interface (SPI), and General Purpose Input/Output (GPIO).

3. The integrated optical transceiver of claim 1, wherein the management unit is configured to control the data processing unit to perform the system-layer functions in response to system-layer control data, wherein the management unit is configured to control, monitor, and manage the optical subassembly in response to the system-layer control data.

4. The integrated optical transceiver of claim 3, wherein the control path interface is configured to send at least a portion of the system-layer control data to the host device.

5. The integrated optical transceiver of claim 3, wherein the management unit is configured to send physical-layer control data to the data processing unit, wherein the data processing unit is configured to insert the physical-layer control data into the second electrical signal, wherein the second optical signal comprises the physical-layer control data.

6. The integrated optical transceiver of claim 3, further comprising a computer memory configured to store the system-layer control data.

7. The integrated optical transceiver of claim 6, wherein the computer memory is configured to store a memory map defined in the SFF-8472 document.

8. The integrated optical transceiver of claim 7, wherein the management unit is configured to establish a bi-directional path between the host device and the data processing unit using only the memory map defined in the SFF-8472 document.

9. The integrated optical transceiver of claim 7, wherein the computer memory comprises at least one memory block outside the memory map, wherein the memory block is configured to store the system-layer control data at a memory address not defined in SFF-8472.

10. The integrated optical transceiver of claim 1, wherein the integrated optical transceiver has a form factor in compliance with a standard selected from the group consisting of GBIC, SFF, SFP, XFP, X2, XENPAK, and SFP+.

11. The integrated optical transceiver of claim 1, further comprising:
    a laser driver in communication with the data processing unit, wherein the laser driver is configured to control the optical subassembly to emit the second optical signal in response to the second electrical signal; and
    a post amplifier in communication with the data processing unit and the optical subassembly, wherein the post amplifier is configured to amplified the first electrical signal and to send an amplified first electrical signal to the data processing unit.

12. An optical communication network system, comprising:
- a host device at a first location;
- a network device at a second location remote to the first location; and
- an integrated optical transceiver plugged into an interface in the host device, the integrated optical transceiver comprising:
  - an optical subassembly configured to produce a first electrical signal in response to a first optical signal received from the network device and to transmit a second optical signal to the network device in response to a second electrical signal, wherein the first optical signal comprises reception signal data, wherein the second optical signal comprises transmission signal data;
  - a data processing unit in communication with the optical subassembly, wherein the data processing unit is configured to extract the reception signal data from the first electrical signal and produce the second electrical signal in response to a third electrical signal comprising the transmission signal data, wherein the data processing unit is configured to perform system-layer functions comprising media access control (MAC), Ethernet/ATM switching, or OAM message processing;
  - a data path interface in communication with the data processing unit, wherein the data path interface is configured to send the reception data to a host device and receive the third electrical signal comprising the transmission data from the host device;
  - a management unit in communication with the optical subassembly and the data processing unit, wherein the management unit is configured to control the data processing unit to perform the system-layer functions; and
  - a control path interface in communication with the management unit and the host device, wherein the management unit is configured to send physical-layer control data to the data processing unit, wherein the data processing unit is configured to insert the physical-layer control data into the second electrical signal, wherein the second optical signal comprises the physical-layer control data, wherein the network device is configured to access the physical-layer control data stored in the computer memory without assistance from the host device.

13. The optical communication network system of claim 12, wherein the integrated optical transceiver comprises a computer memory configured to store the physical-layer control data in compliance with SFF-8472 document.

14. The optical communication network system of claim 12, wherein the data processing unit in the integrated optical transceiver is a passive optical network (PON) MAC.

15. The optical communication network system of claim 12, wherein the control path interface is compatible with a standard selected from the group consisting of Inter-Integrated Circuit (I2C), differential serial interface, a serial peripheral interface (SPI), and General Purpose Input/Output (GPIO).

16. The optical communication network system of claim 12, wherein the management unit is configured to control the data processing unit to perform the system-layer functions in response to system-layer control data, wherein the management unit is configured to control, monitor, and manage the optical subassembly in response to the system-layer control data.

17. The optical communication network system of claim 16, wherein the control path interface is configured to send at least a portion of the system-layer control data to the host device.

18. The optical communication network system of claim 17, further comprising a computer memory configured to store the system-layer control data.

19. The optical communication network system of claim 18, wherein the computer memory is configured to store a memory map defined the SFF-8472 document.

20. The optical communication network system of claim 19, wherein the memory map is configured to store the system-level control data.

21. The optical communication network system of claim 19, wherein the computer memory comprises at least one memory block outside the memory map, wherein the memory block is configured to store the system-layer control data at a memory address not defined in SFF-8472.

22. The optical communication network system of claim 21, wherein the memory map stores a pointer that defines the location of the memory block in the computer memory.

23. The optical communication network system of claim 12, further comprising:
- a laser driver in communication with the data processing unit, wherein the laser driver is configured to control the optical subassembly to emit the second optical signal in response to the second electrical signal; and
- a post amplifier in communication with the data processing unit and the optical subassembly, wherein the post amplifier is configured to amplified the first electrical signal and to send an amplified first electrical signal to the data processing unit.

24. An integrated optical transceiver, comprising:
- an optical subassembly configured to produce a first electrical signal in response to a first optical signal and to emit a second optical signal in response to a second electrical signal, wherein the first optical signal comprises reception signal data, wherein the second optical signal comprises transmission signal data;
- a data processing unit in communication with the optical subassembly, wherein the data processing unit is configured to extract the reception signal data from the first electrical signal and produce the second electrical signal in response to a third electrical signal comprising the transmission signal data, wherein the data processing unit is configured to perform system-layer functions comprising media access control (MAC), Ethernet/ATM switching, forward error correction, or OAM message processing;
- a data path interface in communication with the data processing unit, wherein the data path interface is configured to send the reception data to a host device and receive the third electrical signal comprising the transmission data from the host device, wherein the data path interface is in compliance with a standard selected from the group consisting of GBIC, SFF, SFP, XFP, X2, XENPAK, and SFP+;
- a management unit in communication with the optical subassembly and the data processing unit, wherein the management unit is configured to control the data processing unit to perform the system-layer functions;
- a computer memory configured to store a memory map defined in the SFF-8472 document and a memory block outside the memory map, wherein the memory map stores a pointer that defines the location of the memory block in the computer memory, wherein the memory block is configured to store the system-layer control data; and a control path interface in communication with the management unit and the host device, wherein the control path interface is compatible with a standard selected from the group consisting of Inter-Integrated Circuit (I2C), differential serial interface, a serial peripheral interface (SPI), and General Purpose Input/Output (GPIO).

25. The integrated optical transceiver of claim 24, wherein the system-level control data in the memory map is accessible to a host device remote to the integrated optical transceiver.

26. The integrated optical transceiver of claim 25, wherein the management unit is configured to establish a bi-directional path between the host device and the data processing unit using only the memory map defined in the SFF-8472 document.

* * * * *